United States Patent Office 3,846,123
Patented Nov. 5, 1974

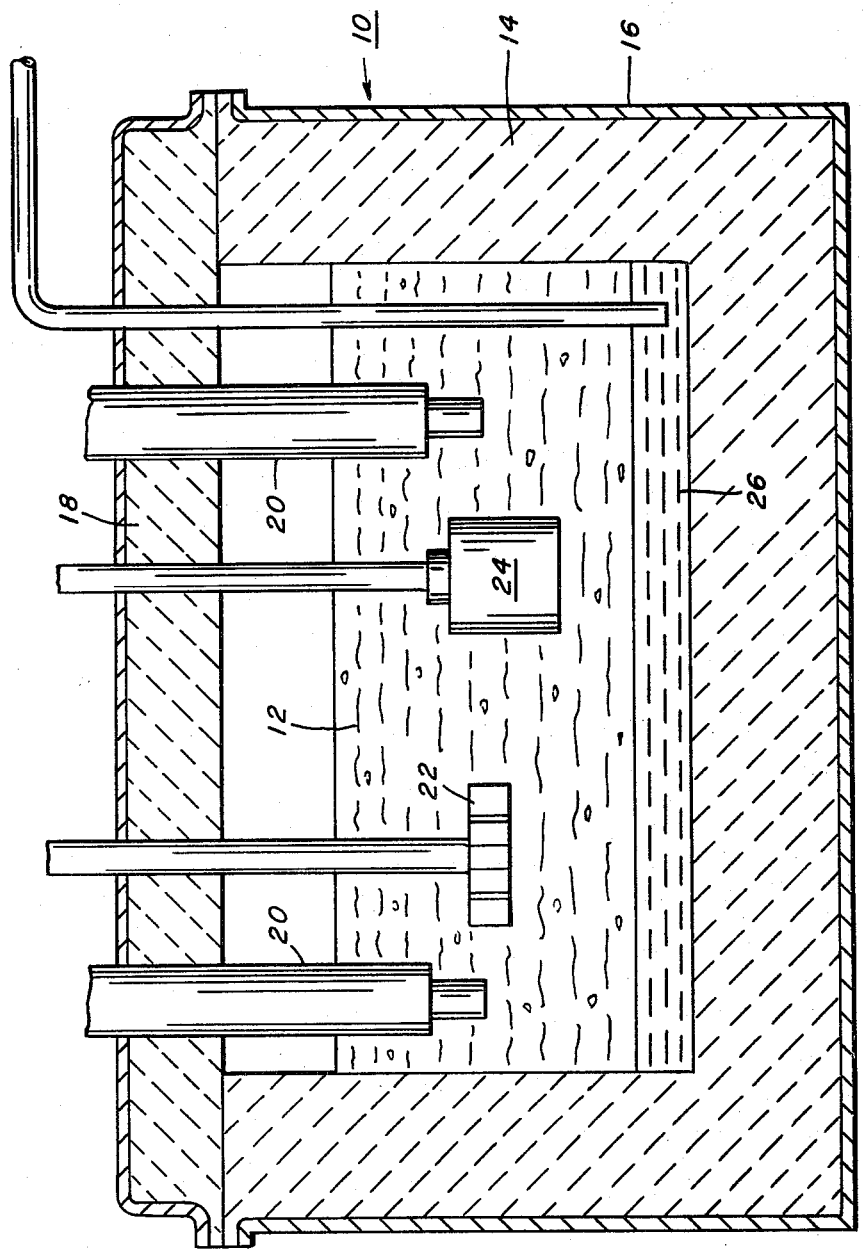

3,846,123
ALUMINUM RECOVERY FROM SCRAP MATERIALS
Bernard J. Racunas, New Kensington, and Noel Jarrett, Lower Burrell, Pa., assignors to Aluminum Company of America, Pittsburgh, Pa.
Filed Sept. 28, 1972, Ser. No. 293,016
Int. Cl. C22b 7/00, 21/00
U.S. Cl. 75—68 R
4 Claims

ABSTRACT OF THE DISCLOSURE

A method of reclaiming aluminum values from secondary aluminum materials containing non-metallic solids such as oxides, nitrides and carbides of aluminum and alloy constituents thereof. The method includes the steps of feeding aluminum materials into a pool of molten salt flux maintained at a temperature greater than the melting point of aluminum. The pool is stirred to mix the aluminum materials therein, the flux being effective to separate non-metallic solids and fines from the aluminum material thereby releasing molten aluminum globules or droplets which settle to the bottom of the pool while non-metallic fines are suspended therein by the stirring action. The aluminum globules coalesce to form a layer or pad of molten aluminum beneath the pool of flux from which the molten aluminum is removed. This enriches the flux with non-metallic solids, which enriched flux is directed to a location within the pool where the solids are removed therefrom, and the flux returned thereto. The feed of aluminum materials to the pool of flux is correlated with the removal of the non-metallic fines to maintain in the pool a non-metallic solids content not exceeding 25 percent by weight of the bath therein.

BACKGROUND OF THE INVENTION

The present invention relates generally to the recovery of free metal content from scrap materials, and particularly to the recovery of free aluminum from sources of secondary or scrap aluminum ranging from aluminum scalpings, turnings, powder, sawdust (and other forms of finely divided scrap) to furnace skim and the residue or dross from rotary barrels employed to separate aluminum from scrap. The terms "free metal" or "free aluminum," as used herein, refer simply to aluminum that is chemically uncombined.

In separating and recovering free aluminum from skim and dross, for example, several methods have been employed. One such method, as just indicated, has involved the use of a barrel in which the skim or dross is deposited and tumbled together with relatively small amounts of coal and a dry salt flux by rotation of the barrel. The rotary barrel process has the disadvantage of inefficient metal recovery because of inefficient contact of the dross or skim with the salt, and a dust and fume problem that requires a substantial investment in air pollution and control devices.

Another method of reclaiming aluminum values from scrap materials makes use of a rotary salt furnace. Here, a furnace containing liquid molten salt and the scrap metal materials is rotated about a horizontal axis, the molten salt wetting oxides and other non-metallic solid impurities in the scrap to promote separation of aluminum droplets from the impurities. The droplets coalesce and settle to the bottom of the furnace from which they are drained. The solid impurities and salt are then dumped together from the furnace in the form of a viscous sludge.

With the rotary furnace process there is poor salt economy since the salt flux and non-metallic impurities are disposed of together at the end of the process. The rotary furnace process is a batch type operation requiring interruption of liquid-solids separating process to dispose of the salt and impurity sludge. Further, there is low metal recovery with the rotary barrel process since the salt-impurity sludge dumped from the rotary furnace still contains large percentages of free metal.

BRIEF SUMMARY OF THE INVENTION

The present invention is directed to an aluminum recovery process providing good salt economy and high metal recovery from secondary aluminum materials on an essentially continuous basis. This is accomplished by feeding the aluminum materials into a mechanically agitated pool of liquid, molten salt flux contained in a closed, non-rotating, refractory lined furnace. The agitation of the pool functions to thoroughly mix and contact the aluminum in the feed material with the liquid flux. The aluminum is thereby freed from oxides and other non-metallic solids and fines associated with the feed material to form discrete globules or droplets which contact each other and coalesce to form larger globules until further growth ceases to occur. When agitation of the pool is sufficiently slowed or stopped, the globules tend to settle out of the molten salt to form a molten metal pad on the furnace bottom. The pad of molten metal is withdrawn from the furnace by tapping or siphoning, for example.

The non-metallic solids and fines separated from the source of feed material by action of the flux, are substantially insoluble in the molten salt, and have a size and configuration which tend to cause them to remain largely in suspension in the pool of salt, thereby allowing the globules of aluminum to settle without substantial entrainment of the solids.

The suspended solids can be removed from the pool of salt and from the furnace by such known methods of solid-liquid separation such as filtering and settling. For example, an open container can be immersed in the molten salt and located in a settling zone within the furnace to collect the solids, the container being periodically lifted from the furnace to dispose of the solids collected therein. Another method of removing the solids from the salt might involve directing the salt, with the solids, to another furnace where the solids would be permitted to settle out of the salt. The salt would be returned to the first furnace, now largely depleted of solids, for reuse therein. To enhance the process of settling the solids in the present invention, the pump-centrifuge device described in a co-pending patent application Ser. No. 293,-017, filed in the names of B. J. Racunas and J. R. Minick concurrently with the present application, may be used.

The process of the present invention provides good salt economy, since the salt in large measure is being continuously reused in the salt furnace, and high metal recovery from the scrap materials since the oxides and other solids tend to remain in suspension in the salt pool while a substantial amount of metal settles out the pool and is withdrawn from the furnace. In addition, the process is rapid and economical since the feed material can be continuously or periodically fed to the furnace and salt pool in any suitable and convenient manner while the metal therein that is separated from the solids is continuously or periodically removed from the furnace. Further, since the salt flux is contained in a closed furnace during the metal-oxide separating process, fumes from the furnace are substantially confined therein, the present invention thereby requiring substantially less air pollution control equipment than rotary barrel and rotary salt furnace arrangements.

The feed of aluminum scrap materials to the furnace and molten flux, in the present invention, is correlated with the removal of solid impurities therefrom to maintain in the pool of flux a solids content not exceeding 25 percent by weight of the flux bath, for reasons explained hereinafter.

THE DRAWING

The invention, along with its advantages and objectives will be more apparent after consideration of the following detail description in connection with the accompanying drawing in which the sole figure is a schematic representation of a furnace structure shown in vertical section, with associated electrodes and rotating components shown in elevation, employed in a preferred embodiment of the process of the present invention.

PREFERRED EMBODIMENT OF THE INVENTION

Referring now to the drawing, an essentially fixed, non-rotatable furnace structure 10 is shown for containing a pool 12 of a molten salt flux, such as $NaCl-KCl-Na_3AlF_6$ for example, maintained at a temperature above the melting point of aluminum preferably by the heat generated by the electrical resistance of the flux to the flow of electrical current through the flux, though the invention is not limited thereto. The furnace has side and bottom walls that are made of a refractory material 14, which material may form a lining within a steel shell 16, for example. The furnace 10 is closed by a top wall 18 which tends to keep the fumes of the salt flux within the furnace, as mentioned above, during the liquid aluminum-solids separation process of the invention presently to be described.

Electrical current may be directed to and through the pool of salt flux (for the heating process) by electrodes 20 extending into the furnace and pool through appropriate openings provided in the cover 18. In a similar manner, a stirring means 22 and particle settling and collecting means 24 are shown extending into the furnace and pool through the cover 18, the number of electrodes, and the number of stirring devices and particle collecting means, as shown in the drawing, being given by way of example only.

To begin the process of recovering aluminum values from secondary aluminum materials in the present invention, suitable means (not shown) are employed to convey the scrap material to the furnace 10 and into the pool of liquid flux 12. Preferably, the material enters the furnace through an opening (not shown) in the furnace cover 18 and falls into the pool 12 to be mixed therein by the stirrer 22 and/or the settling means 24 if 24 is a pump centrifuge device of the type mentioned earlier and further described hereinafter. The mixing function is effective to insure adequate contact of the aluminum material with the flux, the flux being effective to release finely divided free aluminum droplets from the scrap material through interfacial tension phenomenon. The droplets, being molten and liquid because of the temperature of the molten flux, circulate with the flux and contact one another to coalesce and thereby form larger droplets or globules. Coalescence continues until the globules reach an essentially stable size, the ultimate size attained by the globules being dependent upon oxide and fluoride concentrations in the salt flux, and the r.p.m. of the stirrer 22, the circulation of the flux by the stirrer exerting shear forces on the solids and molten materials in amounts proportional to the rotational speed of the stirrer.

During circulation of the molten flux, some of the globules will tend to settle to the bottom of the furnace 10 to form a layer or pad 26 of relatively pure aluminum. After a time sufficient to allow adequate separation of aluminum from the non-metallic impurities, the stirrer is stopped or slowed to enhance metal settling by permitting more of the circulating aluminum globules to settle out of the salt and thus to sink to the layer or pad 26. Liquid metal is removed from the pad by suitable tapping means represented in the drawing by a pipe 28 extending into the pad.

With substantial amounts of the free metal released from the scrap material by the salt, non-metallic solids and fines (such as $Al_2O_3$, $MgO$, $AlMgO_4$, $Al_4C_3$ and $AlN$) are formed in the salt pool. The solids and fines are substantially insoluble in the salt and are largely of such a shape and size that they tend to settle more slowly than the globules of aluminum. The rotation of the stirrer 22 (or 24) is thus more readily effective to hold them in substantial suspension than the metal globules, and to direct the solids and fines to the location of the particle settling means 24, where the solids tend to settle out of the liquid salt flux. As explained earlier, the solids may be separated at 24 by known filtering or settling techniques in the same or a different furnace or by action of the pump-centrifuge device described in the above-mentioned patent application of B. J. Racunas and J. R. Minick. This device is particularly suitable for the particle settling and separating processes since it operates immersed in the molten pool 12 to pump the flux and solids into a bowl structure from the pool, the bowl collecting and concentrating the solids therein while the flux is pumped therethrough to return to the pool. Because of the solids concentrating ability of this device, the bowl collects a minimum of salt and free metal with the non-metallic solids, the liquid salt returning to the pool from the bowl being substantially depleted of solids.

After the particle settling means 24 has collected a sufficient amount of solids, it is removed from the pool of flux 12 and from the furnace 10 to dispose of the collected solids and to thereby clean the settling means 24 for return to the furnace and pool for another cycle of the above operation.

Depending upon the viscosity and other characteristics and parameters of the liquid flux, the stirrer 22 may not be necessary if the pump-centrifuge, as discussed above, is employed as the particle separator and settling means 24, since the pump-centrifuge stirs the pool of flux 12 in the process of collecting non-metallic solids and fines.

In practicing the invention, it has been found that the amount of the non-metallic solids content in the pool of salt flux should not exceed 25 percent by weight of the flux in order to obtain efficient recovery of free metal, the ratio of flux to solids depending in general upon the amount of free metal in the secondary feed material, i.e., higher metal content feeds can tolerate higher suspended oxide-solids levels in the liquid flux. A ten percent or less solids content in the salt pool, with five percent cryolite, works well with substantially all types of aluminum feed materials. The feeding of aluminum materials into the furnace 10 should be correlated with the settling action of the non-metallic solids content to maintain efficient operation of the metal recovery process.

From the foregoing description it should now be apparent that a new and useful process has been disclosed for reclaiming the free metal content in aluminum materials in a manner providing economies and advantages unavailable with previous aluminum recovery processes.

While the invention has been described in terms of preferred embodiments, the claims appended hereto are intended to encompass all embodiments which fall within the spirit of the invention.

Having thus described our invention and certain embodiments thereof, we claim:

1. A method of recovering aluminum values from aluminum material fed to a pool of molten salt, the method comprising the steps of
   (1) feeding aluminum materials into said pool,
   (2) contacting the aluminum materials with said molten salt, the salt being effective to separate non-metallic solids from the aluminum material, and thereby release molten aluminum,
   (3) removing molten aluminum from said pool of salt thereby substantially depleting the same of aluminum values while leaving it enriched with a suspension of non-metallic solids, (4) circulating the salt enriched with non-metallic solids to maintain suspension of the same in said salt and to direct the suspension and salt to a device capable of collecting and thereby removing solids from said salt to substantially deplete the salt of said solids while the salt depleted of said solids is returned directly to the circulating salt from the device, and (5) correlating the feeding of said aluminum materials with the removal of said non-metallic solids to maintain in said pool a solids content not exceeding 25 percent by weight of the salt therein.

2. The method of claim 1 including the step of stirring the pool, and periodically slowing or interrupting the stirring to assist the removal of the molten aluminum in step (3).

3. The method of claim 1 wherein the removal of the nonmetallic solids in step (4) is centrifugically effected.

4. The method of claim 1 including the step of removing the molten aluminum from the vicinity of the pool of salt after globules of molten aluminum coalesce and settle beneath the pool of molten salt.

References Cited

UNITED STATES PATENTS

| 3,198,625 | 8/1965 | Stroup | 75—68 R |
| 3,650,730 | 3/1972 | Derham et al. | 75—68 R |
| 3,694,190 | 9/1972 | Langston | 75—68 R |

FOREIGN PATENTS

| 247,077 | 11/1960 | Australia | 75—68 R |

L. DEWAYNE RUTLEDGE, Primary Examiner

M. J. ANDREWS, Assistant Examiner